United States Patent [19]

Lester

[11] Patent Number: 5,292,704
[45] Date of Patent: Mar. 8, 1994

[54] CATALYST FOR DESTRUCTION OF ORGANOHALOGEN COMPOUNDS

[75] Inventor: George R. Lester, Park Ridge, Ill.

[73] Assignee: Allied-Signal Inc., Morris Township, Morris County, N.J.

[21] Appl. No.: 957,547

[22] Filed: Oct. 6, 1992

Related U.S. Application Data

[60] Division of Ser. No. 714,364, Jun. 12, 1991, Pat. No. 5,176,897, which is a continuation of Ser. No. 345,802, May 1, 1989, abandoned.

[51] Int. Cl.$^5$ .............................................. B01J 23/64
[52] U.S. Cl. ...................................................... 502/309
[58] Field of Search .............. 502/309, 439, 527, 339, 502/325, 350, 352; 423/240 S, 240 R; 588/226, 248

[56] References Cited

U.S. PATENT DOCUMENTS

| | | | |
|---|---|---|---|
| 4,053,557 | 10/1977 | Kagayama | 423/240 |
| 4,059,675 | 11/1977 | Yang | 423/240 |
| 4,152,246 | 5/1979 | Weisang | 208/139 |
| 4,209,496 | 6/1980 | Carpenter | 423/210 |
| 4,468,523 | 8/1984 | Leonard et al. | 502/350 X |
| 4,663,300 | 5/1987 | Lester et al. | 502/66 |
| 4,759,918 | 7/1988 | Homeier et al. | 423/213.5 |
| 4,957,717 | 8/1990 | Imamura et al. | 423/240 R |
| 4,983,366 | 1/1991 | Deller et al. | 423/240 R |

FOREIGN PATENT DOCUMENTS

| | | |
|---|---|---|
| 0056729 | 7/1982 | European Pat. Off. . |
| 0306540 | 3/1989 | European Pat. Off. . |
| 0308789 | 3/1989 | European Pat. Off. . |
| 3623492A1 | 1/1988 | Fed. Rep. of Germany . |
| 59-189935 | 10/1984 | Japan ................. 502/325 |
| 62-065721 | 3/1987 | Japan . |
| 63-007843 | 1/1988 | Japan ................. 502/339 |
| 63-294946 | 12/1988 | Japan . |
| 2035914 | 2/1990 | Japan . |

OTHER PUBLICATIONS

Spivey, J., "Complete Catalytic Oxidation of Volatile Organics", *Ind. Eng. Chem. Res.*, 1987, 26, 2165–80.

J Appl Chem Biotechnol., vol. 25, 1975, G. C. Bond et al. "Catalyzed Destruction of Chlorinated Hydrocarbons", pp. 241–248.

Patent Abstracts of Japan, vol. 10, No. 339 (C-385)(2395), Nov. 15, 1986 & JP, A, 61141919 (Asahi Chem., Ind. Co., Ltd) Jun. 28, 1986–see Abstract.

*Primary Examiner*—Helen M. S. Sneed
*Assistant Examiner*—Douglas J. McGinty
*Attorney, Agent, or Firm*—Frank S. Molinaro; Harold N. Wells; Roger H. Criss

[57] ABSTRACT

This application relates to a catalyst and a process using this catalyst to convert or destroy organic compounds including organohalogen compounds. A preferred catalyst contains as catalytic components titania, vanadium oxide, tungsten oxide, tin oxide and at least one noble metal selected from the group consisting of platinum, palladium and rhodium, characterized in that the vanadium oxide, tungsten oxide and noble metals are uniformly dispersed on the titania. The process of this invention comprises contacting the gas stream, which contains organohalogen compounds and other organic compounds, at a temperature of about 200° to about 500° C. with the catalyst described above in the presence of an oxidizing agent and water. The oxidizing agent can be oxygen or air.

5 Claims, No Drawings

CATALYST FOR DESTRUCTION OF ORGANOHALOGEN COMPOUNDS

This application is a division of application Ser. No. 07/714,364, filed Jun. 12, 1991, now U.S. Pat. No. 5,176,897, which is a continuation of application Ser. No. 07/345,802, filed May 1, 1989, abandoned.

BACKGROUND OF THE INVENTION

Catalytic incineration (oxidation) is an energy efficient method of purifying waste gases, e.g. vapor of solvents, inks, paints, etc. which contain noxious and/or toxic organic components including hydrocarbons and oxygenated hydrocarbons such as alcohols, esters, acids, etc. Such a process involves contacting the waste gas stream with a catalyst in the presence of excess oxygen at a temperature below about 600° C. The contact or residence time of the waste gas with the catalyst is very short, on the order of less than 0.1 seconds. However, the presence of halogenated compounds in the gas stream usually prohibits the use of this process because the catalysts which are used are poisoned or deactivated by the halogen compounds.

Streams containing halogenated organic compounds, referred to hereinafter as organohalogen compounds, usually must be purified by thermal incineration at temperatures of at least 1100° C., using reactors which are large enough to provide long residence times, on the order of greater than 1 second. Thus, thermal incinerators have two disadvantages; 1) the gas stream must be heated to high temperatures, requiring consumption of large amounts of fuel, and 2) the large reactors require a large capital investment. Therefore, there is a need for a catalyst which can destroy organohalogen compounds at lower temperatures and shorter residence times.

The prior art shows that gas streams containing simple organohalides can be oxidized using a catalyst. For example, U.S. Pat. No. 4,039,623 teaches that a waste gas containing $C_2$–$C_4$ halogenated hydrocarbons may be treated by contacting the waste gas with a hydrated nickel oxide catalyst. The process described in the '623 patent works best on unsaturated chlorinated hydrocarbons such as vinyl chloride.

U.S. Pat. Nos. 4,059,675, 4,059,676 and 4,059,683 respectively disclose the use of catalysts containing ruthenium, ruthenium plus platinum and platinum dispersed on a non-oxidizing support to decompose chlorinated organic compounds having one to four carbons. The halogenated organic compounds are characterized in that the total number of hydrogen atoms is at least equal to the total number of halogen atoms in the compound. The compounds are contacted with the catalyst at a temperature of at least 350° C. The oxidation products are $CO_2$, $H_2O$, HCl and $Cl_2$. Thus, both HCl and $Cl_2$ are produced using these catalysts and processes. The production of $Cl_2$ is undesirable because it is extremely corrosive.

Japanese Disclosure J61141919-A teaches that an exhaust gas containing 1,1,1-trichloroethane can be treated by contacting with one or more catalytic oxides of vanadium, chromium, tungsten, manganese, cobalt and nickel. The gas must be contacted with the catalyst for 1–30 seconds at 150°–300° C. Finally, Murakami et al. (see Preprints of Papers of The Seventh International Congress on Catalysis, Jul. 3–4, 1980, Tokyo, Japan, paper B49) disclose that a vanadium oxide on titania catalyst can oxidize benzene, but of the benzene which is oxidized only half of the benzene is completely oxidized, while the other half is converted to maleic anhydride.

It has also been reported by G. C. Bond and N. Sadeghi in *J. Appl. Chem. Biotechnol.*, 25, 241–248 (1975) that a Pt on gamma alumina catalyst could be used to destroy compounds such as $CCl_4$, $CHCl_3$, etc. However, their method requires the combustion of a hydrocarbon fuel and must be run at temperatures above 420° C. in order to be effective. Finally, a review of the state of the art has been published by J. J. Spivey, *Ind. Eng. Chem. Res.*, 26, 2165–80 (1987).

What these references indicate is that a process is not available which can convert organohalogen compounds and especially $C_1$ organohalogen compounds that do not contain any C-H bonds, e.g., $CCl_4$, ClCOOH, $CF_2Cl_2$, $CF_4$, etc., to carbon dioxide, water, and haloacids (haloacids are HCl, HBr, etc.) at a low temperature and high space velocity. These conditions must be met if a process is to have commercial success. Applicant has addressed this problem and has discovered catalysts which can be tailored to the compounds present in the gas stream such that the gas stream can be effectively treated at temperatures as low as 300° C. and a space velocity of about 15,000 $hr^{-1}$.

Applicant's process involves contacting a gas stream with a catalyst at operating conditions. If only $C_1$ organohalogen compounds that do not contain any C-H bonds need to be converted, then the catalyst contains titania and optionally tungsten oxide. If both organohalogen compounds and other organic compounds need to be converted a titania catalyst may be used, although a preferred catalyst will contain titania and vanadium oxide and optionally tungsten oxide and/or a noble metal such as platinum. Finally, tin oxide may be added to any of the above catalysts primarily to increase their stability. Using applicant's catalyst, 99% of the carbon tetrachloride in a gas stream is converted to carbon dioxide and hydrogen chloride at a temperature as low as 240° C. and practical residence times of less than 0.3 seconds. Applicant is the first person to accomplish such a result.

A comparison of the instant catalyst to those reported in the prior art quickly reveals the tremendous advantages of the instant catalyst. For example, applicant's catalyst completely oxidizes benzene to $CO_2$ and water whereas the catalyst of the prior art (Murakami) oxidizes benzene to $CO_2$ and water and to maleic anhydride. Obviously the latter is an undesirable result if one wishes to treat a gas stream containing such chemicals. Additionally, the catalysts of U.S. Pat. Nos. 4,059,675, 4,059,676, 4,059,683 and 4,039,623 are claimed to be effective for oxidizing only those halogenated compounds containing 1 to 4 carbon atoms (excluding carbon tetrachloride). In contrast, applicant's catalyst is able to convert a variety of organohalogen compounds to innocuous compounds regardless of the number of carbon atoms or whether hydrogen atoms are present on the compound or not. Even the Bond and Sadeghi reference which reports conversion of carbon tetrachloride requires temperatures of at least 420° C. and the presence of a hydrocarbon fuel. Therefore, applicant's process represents a substantial improvement in the art.

SUMMARY OF THE INVENTION

This invention relates to a process and catalysts for treating a gas stream. Accordingly, one embodiment of the invention is a process for treating a gas stream containing $C_1$ organohalogen compounds that do not have any carbon-hydrogen bonds, comprising contacting the gas stream at a temperature of about 200° to about 500° C. with a catalyst comprising titania in the presence of an effective amount of water to convert said organohalogen compounds to carbon dioxide and haloacids.

Yet another embodiment of this invention is a process for treating a gas stream containing compounds selected from the group consisting of organohalogen compounds, other organic compounds and mixtures thereof, comprising contacting the gas stream with a catalyst comprising titania at a temperature of about 200° to about 500° C. in the presence of an oxidizing agent and water in an amount effective to convert said compounds to carbon dioxide, water and haloacids.

A further embodiment is a catalyst for treating a gas stream containing organohalogen compounds, other organic compounds and mixtures thereof comprising as active catalytic components titania, vanadium oxide, tungsten oxide, and at least one noble metal selected from the group consisting of platinum, palladium and rhodium, the catalyst characterized in that the vanadium oxide, tungsten oxide and noble metal are uniformly dispersed on the titania.

Other objects and embodiments will become more apparent after a more detailed description of the invention.

DETAILED DESCRIPTION OF THE INVENTION

As heretofore stated, the present invention relates to a catalyst and a process using the catalyst to treat gas streams containing organohalogen compounds. In its simplest form the catalyst of the invention comprises titania. This catalyst has been found effective for converting $C_1$ organohalogen compounds that do not contain any carbon-hydrogen bonds to carbon dioxide and haloacids. A preferred catalyst also contains tungsten oxide. When oxidation of hydrocarbons is also desired a preferred catalyst will contain titania and vanadium oxide while an especially preferred catalyst will also contain tungsten oxide and at least one noble metal selected from the group consisting of platinum, palladium and rhodium. It is also preferred to add tin oxide, primarily as a stabilizer. It is important to note that the titania is an active catalytic component and not just a support.

It is desirable that the titania component have a surface area in the range of about 10 to about 150 $m^2/g$. The titania of the instant invention may be used in any configuration, shape or size which exposes the titania and any other catalytic components dispersed thereon to the gas to be treated. For example, the titania can be conveniently employed in particulate form or the titania can be deposited onto a solid monolithic carrier. When particulate form is desired, the titania can be formed into shapes such as pills, pellets, granules, rings, spheres, etc. The particulate form is especially desirable where large volumes of catalysts are needed, and for use in circumstances in which periodic replacement of the catalyst may be desired. In circumstances in which less mass is desirable or in which movement or agitation of particles of titania may result in attrition, dusting and resulting loss of dispersed metals or undue increase in pressure drop across the particles, a monolithic form is preferred.

In the employment of a monolithic form, it is usually most convenient to employ the titania as a thin film or coating deposited on an inert carrier material which provides the structural support for said titania. The inert carrier material can be any refractory material such as ceramic or metallic materials. It is desirable that the carrier material be unreactive with the catalytic components and not be degraded by the gas to which it is exposed. Examples of suitable ceramic materials include sillimanite, petalite, cordierite, mullite, zircon, zircon mullite, spodumene, alumina-titanate, etc. Additionally, metallic materials which are within the scope of this invention include metals and alloys as disclosed in U.S. Pat. No. 3,920,583 (incorporated herein by reference) which are oxidation resistant and are otherwise capable of withstanding high temperatures.

The monolithic carrier material can best be utilized in any rigid unitary configuration which provides a plurality of pores or channels extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. No. 3,785,998 and U.S. Pat. No. 3,767,453, which are incorporated herein by reference.

If particulate form is desired, the titania can be formed into granules, spheres or extrudates by means well known in the industry. For example, a titania powder (anatase phase) having a surface area of at least 120 $m^2/g$ can be combined with a binder such as a clay and rolled in a disk pelletizing apparatus to give titania spheres. The amount of binder can vary considerably but for convenience is present from about 10 to about 30 weight percent.

Additional catalytic components may be dispersed on the titania by means well known in the art. For example, one may wish to disperse vanadium oxide, tungsten oxide or a combination of the two oxides onto the titania. One way to disperse these components is to impregnate titania spheres or powder (spheres or powder are used as representative examples of shapes of titania) with a solution containing a vanadium and/or tungsten compound. The solution may be an aqueous solution, one using an organic solvent or a mixture of the two, with an aqueous solution being preferred. The criteria used to choose the vanadium and tungsten compounds are that the compounds be soluble in the desired solvent and that the compound decompose at high temperatures to give the appropriate oxide. Illustrative of these compounds are the halides of vanadium and tungsten, oxyacids, oxyacid salts and oxysalts of vanadium and tungsten. Specific examples are tungsten dibromide, tungsten pentabromide, tungsten tetrachloride, tungsten dioxydichloride, tungstic acid, ammonium para-tungstate, vanadium tribromide, vanadium dichloride, vanadium trichloride, vanadium oxychloride, vanadium oxydichloride, vanadic acid, vanadyl sulfate, and ammonium meta-vanadate. Ammonium para-tungstate and ammonium meta-vanadate are the preferred compounds.

The impregnation of the spheres or powder with the metal compound solution may be carried out in ways well known in the art. One convenient method is to place the titania into a rotary evaporator which is equipped with a steam jacket. The impregnating solution which contains the amount of the desired metal in the finished catalyst (as the metal) is now added to the spheres and the mixture cold rolled (no steam) for a time from about 10 to 60 minutes. Next, steam is introduced and the solvent is evaporated. This usually takes from about 1 to about 4 hours. Finally the solid is removed from the rotary evaporator and calcined in air at a temperature of about 450°-700° C. for about 1 to about 3 hours. If both vanadium and tungsten oxide are desired, they may be impregnated simultaneously or sequentially in any order.

In order to be effective in converting organohalogen compounds and other organic compounds it is desirable that the vanadium oxide be present in a concentration from about 0.1 to about 20 weight percent (as the metal) of the titania, and preferably from about 1 to about 5 weight percent. The tungsten oxide should be present in a concentration from about 0.1 to about 20 weight percent (as the metal) of the titania, and preferably from about 5 to about 15 weight percent.

Other methods of dispersing the vanadium and/or tungsten oxide onto the titania support are coprecipitation of the components or cogellation. For further details on these methods of preparing the catalyst see U.S. Pat. No. 4,085,193, which is incorporated herein by reference.

When tin oxide is also desired, tin compounds may be added to the solution containing the vanadium and/or tungsten compounds or the titania support containing vanadium and/or tungsten oxides may be impregnated with a tin compound solution. The solvents which can be used here are the same as for the vanadium and/or tungsten solution. Illustrative of the tin compounds which can be used are tin acetate, tin bromide, tin chloride and tin nitrate. Finally it is desirable that the tin oxide be present in a concentration of about 0.1 to about 2.0 gram atomic weights (gram atoms) of tin per 100 gram atoms of titanium, and preferably from about 0.3 to about 1.0 gram atoms of tin per 100 gram atoms of titanium.

If a noble metal component is desired on the catalyst, it may be chosen from the group consisting of platinum, palladium, rhodium and mixtures thereof. The noble metal component may be dispersed onto the titania spheres or powder which may contain vanadium and/or tungsten oxides by impregnating the material with a solution containing a compound of the desired noble metal or noble metals. The solution may be an aqueous or non-aqueous (organic solvent) solution. Any noble metal compound may be used provided the compound is soluble in the chosen solvent and decomposes to the metal upon heating in air at elevated temperatures. Illustrative of these noble metal compounds are chloroplatinic acid, ammonium chloroplatinate, hydroxy disulfite platinum (II) acid, bromoplatinic acid, platinum trichloride, platinum tetrachloride hydrate, platinum dichlorocarbonyl dichloride, dinitrodiamino platinum, sodium tetranitroplatinate, rhodium trichloride, hexaamminerhodium chloride, rhodium carbonylchloride, rhodium trichloride hydrate, rhodium nitrated, sodium hexchlororhodate, sodium hexanitrorhodate, chloropalladic acid, palladium chloride, palladium nitrate, diamminepalladium hydroxide and tetraamminepalladium chloride.

The impregnation procedure is analogous to that used to disperse the vanadium and/or tungsten oxide. It is desirable that the noble metal be present on the catalyst in an amount from about 0.01 to about 5 weight percent of the titania, and preferably from about 0.1 to about 1.0 weight percent.

If a monolithic form is desired, the titania or the titania plus other components can be deposited onto the monolithic honeycomb carrier by conventional means. For example, a slurry can be prepared by means known in the art such as combining the appropriate amounts of the titania or the titania plus other components in powder form, with water or an aqueous solution of an acid such as nitric, hydrochloric, sulfuric acid, etc. The resultant slurry is ball-milled for about 2 to 6 hours to form a usable slurry. Other types of mills such as impact mills can be used to reduce the milling time to about 5 to 30 minutes. This slurry can now be used to deposit a thin film or coating of titania or titania plus other components onto the monolithic carrier by means well known in the art. One such method involves dipping the monolithic carrier into said slurry, blowing out the excess slurry, drying and calcining in air at a temperature of about 450 to about 700° C. for about 1 to about 4 hours. This procedure can be repeated until the desired amount of titania is deposited on said monolithic honeycomb carrier. It is desirable that the titania be present on the monolithic carrier in an amount in the range of about 50 to about 400 g of titania per liter of carrier volume and preferably from about 100 to about 300 g/l.

An alternative method of preparation is to impregnate a titania coated monolithic carrier which has been coated with only titania by the above procedure with an aqueous solution containing a decomposable vanadium and/or tugsten and optionally tin compound. The vanadium, tungsten and tin compounds which can be used are the same as enumerated above. After one or more of these compounds have been impregnated onto the titania-coated carrier, the monolithic carrier is dried and calcined at a temperature of about 450° to about 700° C. for a time of about 1 to about 6 hours. If both vanadium and tungsten are desired, they may be impregnated simultaneously or individually in any order. The tin component may also be impregnated simultaneously or individually in any order.

If a noble metal component is desired on the catalyst, one or more may be dispersed onto said titania in an analogous way to that of the particulate form. That is, the monolithic honeycomb carrier which has dispersed thereon titania and optionally vanadium oxide and/or tungsten oxides can be dipped into an aqueous solution containing a soluble and decomposable noble metal compound, dried and calcined at a temperature of 400° to 500° C. for about 1 to about 3 hours. Any decomposable noble metal compound as enumerated above may be used. The concentration of the noble metals are also as stated above. Although the noble metal(s) may be impregnated before the vanadium and/or tungsten oxide and optionally tin oxide, it is preferred that they be impregnated after the vanadium, tungsten and optionally tin.

An alternative method of producing a catalyst in the monolithic form is first to grind the titania spheres or powder described above which already have dispersed on them vanadium and/or tungsten oxide. Once these spheres are ground to an average particle size smaller than 50 mesh, a slurry is prepared as described above and a monolithic carrier coated as described. Finally, if a noble metal is desired, it is dispersed thereon as described in the preceding paragraph.

Another embodiment of this invention is a process for destroying or converting by oxidation and/or hydrolysis organohalogen compounds and other organic compounds present in a gas stream comprising contacting the gas stream at a temperature of about 200° to about 500° C. and preferably at a temperature of about 250° to about 450° C. with the catalyst described heretofore. The organohalogen compounds which may be treated are any organic compounds which contain at least one halogen atom in the structure of the compounds. Some specific examples are chlorobenzene, dichlorobenzenes, fluorobenzene, carbon tetrachloride, chloroform, methyl chloride, vinyl chloride, methylene chloride, 1,1,2-trichloroethane, 1,1,1-trichloroethane, ethylene dibromide, trichloroethylene, polychlorinated biphenyls, chlorotrifluoromethane, dichlorodifluoromethane, 1-chlorobutane, fluorotrichloromethane, tetrafluoromethane, ethyl bromide, dichlorofluoromethane, chloroformic acid, trichloro acetic acid, trifluoro acetic acid, 2-chloroethyl mercaptan and cyanogen chloride. A subgroup of the organohalogen compounds is composed of those $C_1$ organohalogen compounds which do not contain any carbon-hydrogen bonds. Specific examples of these compounds are chlorotrifluoromethane, dichlorodifluoromethane, fluorotrichloromethane, tetrafluoromethane, dichlorofluoromethane, chloroformic acid, and carbon tetrachloride. The gas stream may also contain other organic compounds which do not contain any halogens in their structure. These other organic compounds include hydrocarbons, oxygenates, amines, mercaptans, etc. Specific examples include benzene, toluene, phenol, ethyl alcohol, isopropyl amine, ethyl mercaptan, butyl phthalate, aniline, formaldehyde, methyl ethyl ketone, acetone, etc.

The catalyst to be used in this process has been described heretofore. Although the catalyst containing only titania is very active for the destruction of organohalogen compounds such as carbon tetrachloride, a catalyst containing titania and tungsten oxide is even more active for this function. Inclusion of vanadium oxide with titania has a slightly negative effect on the activity of the titania for destruction of carbon tetrachloride, but increases the activity of the titania for the destruction of organics such as benzene. Similarly, the inclusion of tin oxide is advantageous for improving the activity for the destruction of some classes of volatile organic compounds. The inclusion of a noble metal component is also very effective for improving the ability of the catalyst to destory difficult-to-oxidize organic compounds and to ensure complete conversion of the compounds to carbon dioxide, water and haloacids as well as conversion of any products of incomplete oxidation such as carbon monoxide. For example, in a laboratory test a $V_2O_5/WO_3/TiO_2$ catalyst oxidized 99% of the benzene in the feed stream at a temperature of 390° C., whereas when platinum was added 99% conversion was obtained at 225° C.

It is also desirable that the gas stream to be treated contain water vapor. In the case where $C_1$ organohalogen compounds that do not contain C—H bonds are to be converted, the conversion process involves hydrolysis and thus water is a necessary component of the process. In the case where the organohalogen compounds contain C—H and/or C—C bonds, it is also desirable to have water present in the gas stream so that haloacids are formed, e.g., HCl, instead of molecular halogen compounds, e.g., $Cl_2$. It is desirable to produce haloacids instead of molecular halogen compounds for two reasons. First, an acid such as HCl is much more easily trapped and neutralized from the effluent gas stream than chlorine ($Cl_2$), thereby reducing corrosion problems in downstream process equipment. Second, molecular halogen compounds can attack the components of the catalyst much more easily than haloacids, thereby decreasing the life of the catalyst.

Usually the gas streams will contain adequate water since the gas stream is often a product of a combustion process. However, if the gas stream does not contain any water, it may be added to the gas stream prior to contacting the gas stream with the catalyst. The minimum amount of water needed is that amount which will give an H:X atomic ratio of 1:1 where H is the total hydrogen atoms and X is the total halogen atoms.

Another method of providing the needed water to a dry gas stream is to have a hydrocarbon or other organic compound, e.g., ethylene, propylene, methanol, ethanol, acetone, methyl ethyl ketone, etc. present in the waste gas stream which are combusted over the catalyst to carbon dioxide and water. If such compounds are not present in the waste gas stream, they may be added prior to contact with the catalyst. Additionally, if the gas stream does not contain oxygen or air, it must be added to carry out the combustion. The amount of oxygen needed is at least the stoichiometric amount necessary to combust the organic compound. The amount of such organic compound is chosen so that the ratio of total hydrogen from all sources in the gas stream entering the catalyst reactor to total halogen atoms is at least 1:1.

When $C_1$ organohalogen compounds that do not contain any carbonhydrogen bonds are to be treated, it is not necessary that the gas stream contain an oxidizing agent, but when organohalogen compounds with at least one carbon-hydrogen bond or other organic compounds are to be converted, the gas stream must contain enough of an oxidizing agent to completely oxidize these compounds to carbon dioxide, water and haloacids. Examples of oxidizing agents are oxygen and air, with air being preferred for convenience. Many gas streams already contain enough oxygen ($O_2$) to oxidize all the pollutants, and most gas streams contain a large excess. In general, a large excess of air greatly facilitates the oxidation reaction. In the event that the gas stream does not contain enough oxidizing agents, oxygen or air may be injected into the gas stream prior to contact with the catalyst. The minimum amount of oxidizing agent which must be present in the gas stream is the stoichiometric amount necessary to convert the carbon and hydrogen present in the compounds to carbon dioxide and water. For convenience and to ensure that the oxidation reaction goes to completion it is desirable that an excess of the oxidizing agent be present. Accordingly, it is preferable that at least two times the stoichiometric amount and most preferably at least five times the stoichiometric amount of oxidizing agent be present in the waste gas stream.

The flow rate of the gas stream over the catalyst is not critical since the contact time required to destroy the pollutants is very short (less than about 1.0 sec). Therefore, the gas hourly space velocity (CHSV) can vary substantially from about 1,000 to about 100,000 hr$^{-1}$ and preferably from about 4,000 to about 30,000 hr$^{-1}$ based on gas rates calculated at standard temperature and pressure. The GHSV can be controlled by adjusting the size of the catalyst bed.

The process of this invention is also applicable to processes wherein liquid organohalogen compounds and organic compounds are vaporized and mixed with an oxidizing agent such as air. It is also to be understood that the process of the present invention is not dependent on the concentration of the organic compounds and/or the organohalogen compounds. Thus, gas streams with a very wide concentration range of pollutants can be treated by the instant process.

Once the gas stream has been contacted with the catalyst and the pollutants destroyed, the catalyst treated gas stream may be further treated, if desired, to remove the halogen acid and any halogens which are formed during the conversion process. For example, the catalyst treated gas stream may be passed through a scrubber to absorb the acid. The scrubber may contain a base such as sodium or ammonium hydroxide which neutralizes the acids and solubilizes the halogens as basic hypohalites and halides.

A particularly unique feature of our process is that the catalyst can remove greater than 99 percent of the hydrocarbons and organohalogen compounds for long periods of time. For example, in laboratory tests a catalyst consisting of a monolithic honeycomb carrier coated with titania and having dispersed thereon vanadium oxide, tungsten oxide and platinum was able to oxidize at least 99% of the carbon tetrachloride in the test gas at 375° C. and 15,000 hr$^{-1}$ GHSV for at least 1,500 hours.

In order to more fully illustrate the advantages to be derived from the instant invention, the following examples are set forth. It is to be understood that the examples are by way of illustration only and are not intended as an undue limitation on the broad scope of the invention as set forth in the appended claims.

EXAMPLE I

A laboratory apparatus was set up to evaluate the efficiency of catalysts for oxidizing hydrocarbons and organohalogen compounds. A quartz tubular reactor was placed inside a Lindburg furnace. The gases were introduced from the bottom of the reactor and flowed upward along an annular section to preheat the gases and then the gases were flowed downwardly over the catalyst. A monolithic honeycomb carrier catalyst having dimensions 2.22 cm diameter by 2.54 cm long was placed in the reactor and evaluated.

Table 1 describes the composition of the gas used to evaluate the catalyst.

TABLE 1

| Composition of Test Gas | |
|---|---|
| Component | Concentration (volume) |
| *Carbon Tetrachloride | 1,000 ppm |
| *Chlorobenzene | 100 ppm |
| *Dichlorobenzene | 100 ppm |
| *Fluorobenzene | 100 ppm |
| *Benzene | 300 ppm |
| *Toluene | 300 ppm |
| Water | 1.5% |
| Air | Balance |

*For these tests, only one of these hydrocarbons or organohalogen compounds was present in the gas during each test.

The catalyst was evaluated by flowing the test gas over the catalyst while heating the catalyst to 375° C. If 99% conversion was not reached by 375° C., the temperature was increased until 99% conversion was obtained or a maximum temperature of 600° C. was reached. The furnace was then turned off and the reactor allowed to cool to 150° C. While the temperature was dropping, a flame ionization detector (FID) analyzer was used to analyze the outlet gas and obtain the concentration of residual hydrocarbon or organohalogen compound. the conversion efficiency was calculated at various temperatures by the equation $$\frac{C_{in} - C_{out}}{C_{in}} \times 100\%$$

where $C_{in}$ and $C_{out}$ are the inlet and outlet concentrations respectively of the hydrocarbon or organohalogen compound. From these calculations, the temperature required to reach a given conversion was obtained.

EXAMPLE II

A titania catalyst was prepared as follows. In a ball mill there were mixed 100 g of titania (obtained from Degussa Corp. and designated P-25) and 200 g of water. This mixture was milled for about 3 hours.

A cylindrical-shaped cordierite monolith with a diameter of 2.22 cm and a length of 7.62 cm and having 400 square channels per square inch of facial area was dipped into the above-described slurry. After dipping, the excess slurry was blown out with an air gun and the monolith was then calcined in air for about 1 hour at 540° C. This procedure was repeated until the monolith contained 226 g of titania per liter of monolith volume. This catalyst was designated catalyst A.

EXAMPLE III

A titania and vanadium oxide catalyst was prepared as follows. In a beaker there were mixed 11.6 g of ammonium meta-vanadate and 1,500 g of water. To this solution there were added 150 g of titania. After mixing the mixture was evaporated on a steam bath and then calcined at 540° C. for 1 hour. The resultant powder contained 5.4% vanadium oxide.

Next a slurry of the titania/vanadium oxide was prepared by placing 100 g of the powder in a ball mill with 200 g of water and milling for about 3 hours. A cordierite monolith of the size and shape as in Example II was coated as in Example II to give a monolith which contained 195 g of titania per liter of monolith volume. This catalyst was designated catalyst B.

EXAMPLE IV

A titania and tungsten oxide catalyst was prepared in an analogous manner as the catalyst B of Example II except that 25.8 g of ammonium paratungstate was used which gave a concentration of 11.1% tungsten oxide. Finally, the monolith contained 214 g of titania per liter of monolith volume. This catalyst was designated catalyst C.

EXAMPLE V

A catalyst containing titania, vanadium oxide, tungsten oxide and tin oxide was prepared as follows. First, 3.7 g of SnCl$_4$.5H$_2$O were dissolved in 25 g of water which was then neutralized with NH$_4$OH to a pH of 7. The precipitate was filtered, dried and dissolved in 2,500 g of water along with 27 g of ammonium paratungstate and 12 g of ammonium meta-vanadate. To this solution there were added 150 g of titania. This mixture was dried on a steam bath and then calcined at 540° C. for one hour. The composition of the powder was analyzed and found to contain 82.1% titania, 12.6% tungsten oxide, 5.0% vanadium oxide and 0.2% tin oxide.

A slurry was prepared by ball milling 100 g of the above powder with 200 g of water for about 3 hours. This slurry was used to coat a cylindrical shaped monolith as in Example II. A total of 207 g of titania per liter of monolith volume was deposited on the monolith. This catalyst was designated catalyst D.

EXAMPLE VI

A catalyst containing titania, vanadium oxide, tungsten oxide and tin oxide was prepared as in Example V. This sample was now impregnated with platinum by dipping the monolith into a 50 ml aqueous solution of chloroplatinic acid having a concentration of 11 mg Pt/ml of solution. After impregnation the catalyst was calcined at 540° C. for one hour. Part of the catalyst was analyzed and found to contain 1.7 g Pt/l of volume or 0.8 weight percent of the titania. This catalyst was designated catalyst E.

EXAMPLE VII

Samples A, B, C, D and E were tested using the procedure of Example I. A new sample of catalyst was used in testing for destruction of benzene or carbon tetrachloride. These results are presented in Table 2.

TABLE 2

Catalyst Efficiency for the Destruction of Hydrocarbons and Organohalogen Compounds

| Catalyst I.D. | Benzene Conversion | | | $CCl_4$ Conversion | | |
|---|---|---|---|---|---|---|
| | *T-99 | *T-90 | *T-50 | *T-99 | *T-90 | *T-50 |
| A ($TiO_2$) | — | 575 | 390 | 289 | 271 | 246 |
| B ($TiO_2/V_2O_5$) | 404 | 355 | 297 | 335 | 292 | 238 |
| C ($TiO_2/WO_3$) | — | 475 | 292 | 260 | 235 | 205 |
| D ($TiO_2/V_2O_5/WO_3/SnO_2$) | 355 | 316 | 270 | 290 | 253 | 212 |
| E ($TiO_2/V_2O_5/WO_3/SnO_2/Pt$) | 305 | 268 | 235 | 280 | 248 | 210 |

*Temperature (°C.) required to reach stated conversion.

The data presented in Table 2 show that a titania only catalyst (catalyst A) can convert 99% of $CCl_4$ at a temperature below 300° C. Adding $V_2O_5$ to titania (catalyst B) improves its ability to oxidize benzene, but inhibits the titania ability to convert $CCl_4$. The combination of titania and tungsten oxide (catalyst C) improves the conversion of $CCl_4$ while the combination of titania/$V_2O_5/WO_3/SnO_2$ (catalyst D) improves benzene conversion. Finally, adding platinum gives the best activity for benzene oxidation.

I claim as my invention:

1. A catalyst for contacting a gas stream containing organohalogen compounds, other organic compounds or mixtures thereof, in the presence of an oxidizing agent and optionally water and producing carbon dioxide, water and haloacids, comprising as active catalytic components titania and relative to the titania 0.1-20 wt. % (as metal) vanadium oxide, 0.1-20 wt. % (as metal) tungsten oxide, and 0.01-5 wt. % of at least one noble metal selected from the group consisting of platinum, palladium, and rhodium, the catalyst characterized in that the vanadium oxide, tungsten oxide, and noble metal are uniformly dispersed on the titania.

2. A catalyst for contacting a gas stream containing organohalogen compounds, other organic compounds or mixtures thereof, in the presence of an oxidizing agent and optionally water and producing carbon dioxide, water and haloacids, comprising as active catalytic components titania and relative to the titania, 0.1-20 wt. % (as metal) vanadium oxide, 0.1-20 wt. % (as metal) tungsten oxide, and 0.01-5 wt. % of at least one noble metal selected from the group consisting of platinum, palladium, and rhodium, the catalyst characterized in that the vanadium oxide, tungsten oxide, and noble metal are uniformly dispersed on the titania and said catalyst is deposited on a ceramic or metallic honeycomb carrier.

3. The catalyst of claim 1 where the titania support is in the shape of spheres, granules or extrudates.

4. The catalyst of claim 2 where the titania is present in a concentration of about 50 to about 400 g of titania per liter of carrier volume.

5. The catalyst of claim 1 where the catalyst also contains tin oxide ($SnO_2$) in a concentration of about 0.1 to about 2.0 gram atoms of tin per 100 gram atoms of titanium.

* * * * *